United States Patent
Bellifemine (10) Patent No.: US 6,742,927 B2
(45) Date of Patent: Jun. 1, 2004

(54) INFRARED THERMOMETER (75) Inventor: Francesco Bellifemine, Varese (IT)

(73) Assignee: La Tecnica S.r.l., Vedano Olona (IT)

( * ) Notice: Subject to any disclaimer, the term of this patent is extended or adjusted under 35 U.S.C. 154(b) by 0 days.

(21) Appl. No.: 10/329,960

(22) Filed: Dec. 26, 2002

(65) Prior Publication Data

US 2003/0099277 A1 May 29, 2003

Related U.S. Application Data (62) Division of application No. 09/600,681, filed as application No. PCT/IT98/00379 on Dec. 23, 1998, now Pat. No. 6,527,439.

(30) Foreign Application Priority Data

Jan. 30, 1998 (IT) .......................... MI98A0169

(51) Int. Cl.[7] .......................... G01K 14/00; G01K 5/00
(52) U.S. Cl. ...................... 374/121; 374/142; 374/141
(58) Field of Search ................. 374/120, 121, 374/141, 142; 600/474

(56) References Cited

U.S. PATENT DOCUMENTS

| 4,254,485 | A | * | 3/1981 | Akita | 367/117 |
|---|---|---|---|---|---|
| 4,275,741 | A | * | 6/1981 | Edrich | 600/549 |
| 4,623,264 | A | * | 11/1986 | Mitchell | 374/117 |
| 4,726,226 | A | * | 2/1988 | Tellerman | 73/292 |
| 4,815,479 | A | * | 3/1989 | Carr | 600/549 |
| 4,910,717 | A | | 3/1990 | Terry | |
| 5,172,978 | A | | 12/1992 | Nomura et al. | |
| 5,388,907 | A | | 2/1995 | Aoyama et al. | |
| 5,626,424 | A | | 5/1997 | Litvin et al. | |
| 5,639,162 | A | | 6/1997 | Sai | |
| 5,640,144 | A | * | 6/1997 | Russo et al. | 340/568 |
| 5,671,190 | A | * | 9/1997 | Kroemer et al. | 367/99 |
| 5,839,829 | A | | 11/1998 | Litvin et al. | |
| 5,855,553 | A | * | 1/1999 | Tajima et al. | 600/474 |
| 5,877,688 | A | * | 3/1999 | Morinaka et al. | 340/584 |
| 5,973,996 | A | * | 10/1999 | Zhevelev et al. | 367/99 |
| 6,196,714 | B1 | | 3/2001 | Bellifemine et al. | |
| 6,234,669 | B1 | | 5/2001 | Kienitz et al. | |
| 6,290,389 | B2 | | 9/2001 | Schmidt et al. | |
| 6,326,915 | B1 | * | 12/2001 | Chen et al. | 367/99 |
| 2002/0173696 | A1 | * | 11/2002 | Kolarovic et al. | 600/549 |
| 2002/0188218 | A1 | * | 12/2002 | Lipman | 600/557 |

FOREIGN PATENT DOCUMENTS

| DE | 195 28 590 A | | 2/1997 | |
|---|---|---|---|---|
| JP | 57163830 A | * | 10/1982 | 374/121 |
| JP | 02245624 A | * | 10/1990 | 374/121 |
| JP | 03059491 A | * | 3/1991 | G01W/1/14 |
| JP | 03108632 A | * | 5/1991 | G01N/1/00 |
| JP | 04313093 A | * | 11/1992 | 367/107 |
| WO | WO 98 01730 A | | 1/1998 | |

* cited by examiner

Primary Examiner—Christopher W. Fulton
Assistant Examiner—Mirellys Jagan
(74) Attorney, Agent, or Firm—Pearne & Gordon LLP (57) ABSTRACT

The invention relates to an infrared thermometer wherein control means signal or determine a correct positioning of the intensity transducer tasked with measuring the infrared radiation emitted by the patient whose temperature needs to be known.

11 Claims, 10 Drawing Sheets

INFRARED THERMOMETER

CROSS-REFERENCE TO RELATED APPLICATIONS

This application is a divisional application of U.S. patent application Ser. No. 09/600,681, filed Jul. 21, 2000 now U.S. Pat. No. 6,527,439, which is a 371 of PCT application no. PCT/IT98/00379, filed Dec. 23, 1998.

This application was published in English on Aug. 5, 1999 as International Publication Number WO 99/39166.

The present invention relates to an infrared thermometer.

Specifically, the subject thermometer finds application both in the home sector and in the health care or veterinary sectors for measuring the temperature of the human or animal body.

BACKGROUND OF THE INVENTION

As is well known, in order to effect thermometric measurements on the human or animal body, infrared thermometers have recently found widespread use, replacing the different types of mercury—or in any case liquid column—or digital thermometers. Infrared thermometers are able to determine the temperature of a body based on the intensity of the infrared radiation emitted by the body itself. It should be noted that all bodies emit a radiation proportional to their current thermal condition.

On the basis of this principle, currently traded infrared thermometers detect the intensity of the infrared radiation emitted by particular areas of the human or animal body and, from such a measurement, determine with sufficient precision the temperature of the body being measured.

In greater detail, it should be noted that in order to obtain a reliable thermal measurement it is necessary to perform the measurement positioning the thermometer in such a way that the infrared radiation sensor is exposed solely to irradiation from part of the body or better stated from the part of the body to be subjected to the measurement and is not instead influenced by other bodies around it. Moreover, the distance whereat the infrared radiation sensor is positioned must be known perfectly, thereby allowing to correlate the radiation intensity detected with the heat level of the body being measured.

For the reasons summarily discussed above, infrared thermometers have currently found widespread use which are set up to detect the temperature of the human body by measuring the radiation emitted by the ear drum membrane. For this purpose a probe is appropriately inserted in the patient's ear thereby enabling to measure the temperature in the correct position where the thermal state is substantially constant and influenced by irradiation coming solely from the eardrum membrane. In practice the thermometers described above are provided with a probe of such shape and dimensions as to be fit for insertion in the patient's auditory canal. Such probe is internally provided with a waveguide to convey the infrared radiation adequately to the sensor housed in the thermometer.

Although the technical solution described above certainly allows to have sufficiently reliably measurements, the need has arisen to provide the probe associated to the infrared thermometer described above with protective sheaths or caps whose function is hygienic, sheaths which clearly need to be replaced or sterilised every time one moves from a patient to another.

Obviously, this sort of situation causes drawbacks both in terms of ease of use of the thermometer, and in terms of intrinsic costs since it is necessary to provide for the sterilisation of the protective sheath or in any case for its replacement.

Also from the standpoint of employment, it should be noted that the infrared thermometer briefly analysed above being active on the ear creates a certain discomfort to the patient and at times, when operating on children, it may even be very difficult to obtain a reliable temperature measurement, as can easily be intuited.

More in general, the accuracy of the measurement is linked to unpredictable factors such as the correct and precise positioning of the probe and/or the possible presence of dirt or ear wax in the auditory canal.

BRIEF SUMMARY OF THE INVENTION

Given such premises, the fundamental aim of the present invention is to make available a new infrared thermometer which is able to perform in an extremely reliable manner the measurement of a patient's temperature with no need for parts of the thermometer itself to come in contact with the body undergoing the measurement.

In addition to this fundamental aim, another important aim of the invention is to offer an infrared thermometer which can be used without causing the patient any discomfort and whose employment can be found extremely practical and intuitive even by absolutely inexperienced personnel.

Not least, yet another aim of the invention is to offer an infrared thermometer which can be simply structured, easy and economical to manufacture and which allows an easy-to-read and instantaneous temperature display system.

BRIEF DESCRIPTION OF THE SEVERAL VIEWS OF THE DRAWINGS

These and other aims besides are substantially reached by an infrared thermometer according to the description provided in the accompanying drawings. Further features and advantages will be more readily apparent from the detailed description of some preferred, but not exclusive, embodiments of an infrared thermometer according to the present invention.

DETAILED DESCRIPTION OF THE INVENTION

The present invention relates to an infrared thermometer indicated in its entirety with the number 1 in the accompanying drawings.

The thermometer 1 comprises a containment body 2 wherein the electronic and optical circuitry, which will be better described below, is housed.

In particular, the containment body 2 is set to house an intensity transducer 3 sensitive to the infrared radiation emitted by bodies, in particular human or animal, whereof the thermometric reading is to be taken.

Preferably, the infrared radiation intensity transducer is positioned in correspondence with a head area 2a of the body 2 set to be directed towards the body of the patient whose temperature is to be measured. In practice, thanks to the particular position of the intensity transducer, the latter is substantially sensitive to the infrared radiation emitted by a pre-set measurement area of a patient generating at its output a corresponding measurement signal proportional to the intensity of the radiation received by the transducer. A processing unit or CPU 4 is operatively associated to the intensity transducer, possibly with the prior interposition of an analogue to digital conversion device 5, to receive the measurement signal and be able to compute a corresponding temperature of the measured area.

Since obviously the reliability of the measurement of the temperature of the measured area is linked to the distance of the transducer from the measured area itself, the subject thermometer is advantageously provided with control means able to define a condition of correct positioning of the transducer at a pre-set distance "D" from the measured area. In this way, since the control means assure the precise determination of the position wherein the intensity transducer is at the aforementioned distance "D" from the measured area, the temperature measured in correspondence with such position is not subject to measurement errors which may arise due to an imprecise positioning of the thermometer and hence of the transducer associated thereto.

Figure 1A:
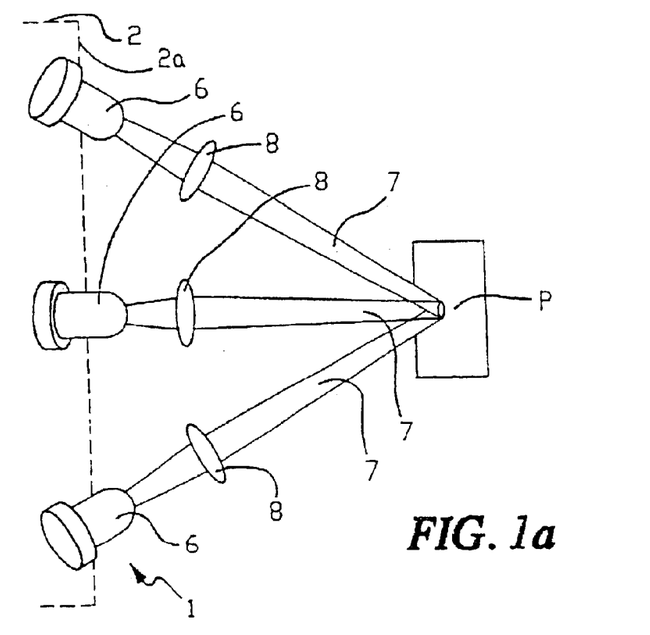
FIGS. 1a and 1b schematically show a first embodiment of control means associated to the subject thermometer and set to define a condition of correct positioning of the thermometer itself.
Figure 1B:
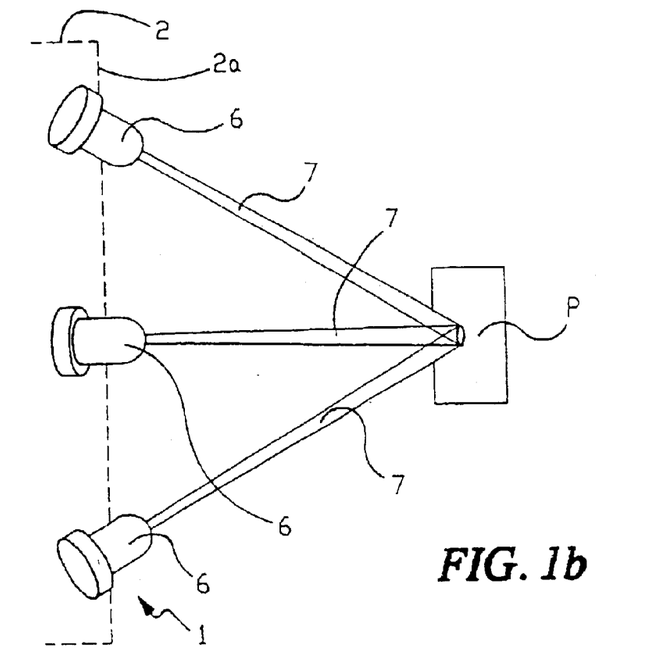

FIGS. 1a, 1b show in greater detail a first embodiment of the control means. More specifically the control means of FIGS. 1a, 1b comprise means 6 for generating at least two and preferably three light rays 7 converging in a pre-determined area P to define a pre-set figure at a distance from the transducer corresponding to the pre-set distance "D".

In practice, the three light rays will compose the pre-set figure, for instance a light spot, a circle or even any imaginary shape, only when the area to be measured is exactly at the pre-set distance "D" from the intensity transducer.

The user therefore has an immediate visual cognition that the correct positioning condition has been reached since by moving closer thereto or farther away therefrom, the pre-set figure would immediately be decomposed with the consequent immediate perception by the user.

Advantageously the generating means produce at least three rays 7 not mutually coplanar so that the thermometer and thus the transducer are always correctly positioned in a condition of substantial perpendicularity with respect to the measured area.

It should be noted that with only two mutually coplanar rays it would not be possible to perceive movements of the thermometer which would determine a displacement of the light rays in a plane orthogonal to the common plane whereon the light rays themselves lie, which would bring about the possibility of an erroneous temperature measurement due to a positioning of the intensity transducer at a smaller distance than the pre-set distance "D"; in this case the intensity transducer may undesirably be subjected to the influence of the radiation emitted by parts of the patient's body other than the measured area.

Advantageously, to increase resolution and positioning precision, four, five or more non coplanar rays may be provided, converging in an area p to define a pre-determined figure only upon reaching the correctly positioned condition of the transducer.

From the construction point of view, it may be provided for the light rays to be generated by a corresponding number of light sources and thus in the case of three converging light rays by three separate light sources.

Alternatively it may be provided for the generating means to comprise a light source set to generate a single main light ray which is then split into the three converging rays by optical means operating downstream of the light source.

According to an additional alternative, a light source may lastly be provided that is tasked with generating a corresponding light ray as well as a second source set to generate a main light ray which shall then be split by optical means into two of the three convergent rays.

Obviously if solutions with four, five or more converging rays are adopted, all possible combinations in terms of generating means may be employed in order to meet the operating needs that the thermometer shall be destined to encounter on each occasion. Clearly, the choice of separate light sources may be advantageous if one wishes to avoid optical reflection systems operating downstream of the source and desires for instance to operate with light sources of different hues.

Also from the construction standpoint the light sources may be laser or LED or of another nature capable of generating sufficiently collimated visible light beams.

Use may possibly be made of optical collimation systems 8 positioned downstream of the light source and capable of receiving as an input a non collimated or weakly collimated light ray, generating as their output a highly collimated light ray.

To this end, use may advantageously be made of plano-convex or bi-convex lenses, possibly coupled in series and positioned in such a way as to be active on each of said converging rays. The thermometer shall also be provided with means for displaying the temperature. The processing unit, able to detect an intervention by the user on appropriate command means such as keypads or others, manages the display of the reading when the user deems that the condition of correct positioning has been reached activating the display means.

The display means may be conventional, such as liquid crystal displays, or image projection displays.

Obviously, given the operating mode of the control means in accordance with the embodiment as per FIG. 1, the converging light rays shall have to be visible, since the task of commanding the activation of the temperature reading through the aforementioned control means falls entirely on the user.

In other words, when the user realises that the predetermined figure is composed on the measured area, he/she knows that the thermometer is in a condition of correct positioning and thus commands the start of the reading through keypads.

It should be noted that constructively command means may be provided comprising a keypad able to activate the emission of the converging rays and to command the temperature reading. Such a keypad may comprise separate actuators or a single bi or tri-stable actuator (off condition, converging ray activation condition, temperature reading condition).

With reference to FIGS. 2a through 7, a second possible embodiment of the control means is shown therein.

Figure 2A:
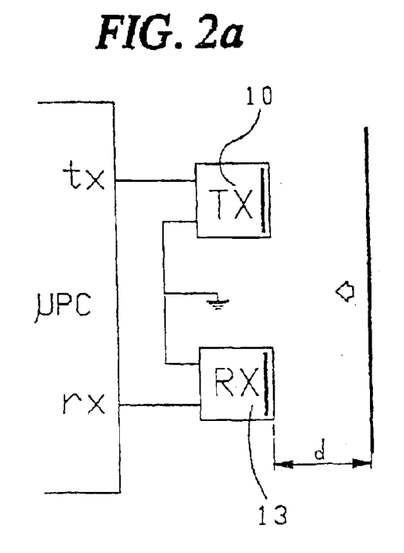
FIGS. 2a and 2b show a second embodiment of control means able to be associated to a terminal portion of the infrared thermometer constituting the subject of the present invention.
Figure 2B:
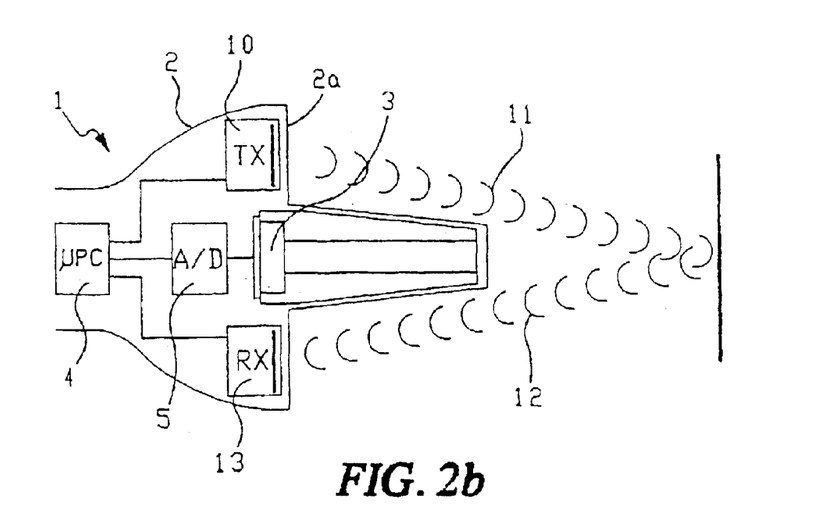

In particular, FIGS. 2a and 2b show control means comprising an emitter 10 of an undulatory signal 11, for instance a sound or electromagnetic signal, set to be incident on the patient's measured area determining a corresponding return undulatory signal 12 which is detected by a receiver 13. Transmitter and receiver are connected to the processing unit 4 which commands the transmission of the undulatory signal by the transmitter and simultaneously activates counter means to determine the time delay "r" (FIG. 2c) between the transmitted signal and the return signal.

Figure 2C:
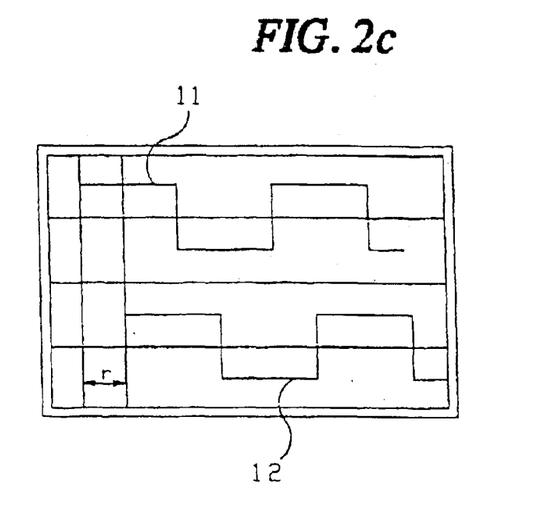
FIG. 2c schematically shows the operation of the means in FIGS. 2a and 2b.

From such time delay the actual distance between the transducer 3 and the measured area is then computed by the processing unit.

The processing unit constantly compares the actual distance measured with said pre-set distance, commanding signalling means slaved thereto when the actual distance coincides with or falls within a pre-determined range approaching the pre-set distance "D". The signalling means may be acoustic, optical or of any other nature suitable to indicate to the user that the condition of correct positioning of the intensity transducer has been reached. Preferably the processing unit is able to assign a predetermined differential delta to define an interval "D−Δ; D+Δ" around the pre-set distance within which the actual distance must fall for the positioning of the intensity transducer to be considered sufficiently correct.

Advantageously the processing unit computes the temperature of the measured area only upon reaching the correct positioning condition of the transducer not considering the signals coming from the intensity transducer when the transducer is outside the acceptable range defined by the interval "I" (D−Δ; D+Δ). It should be noted, in this regard, that the intervention of the processing unit in the computation of the temperature of the measured area can be automatic, as soon as the processing unit recognises that the transducer is in the correct positioning condition, or manual, upon command from keypads or other activation means whereon the user can act when he/she is made aware by the signalling means that the correct positioning condition has been reached.

Figure 3:
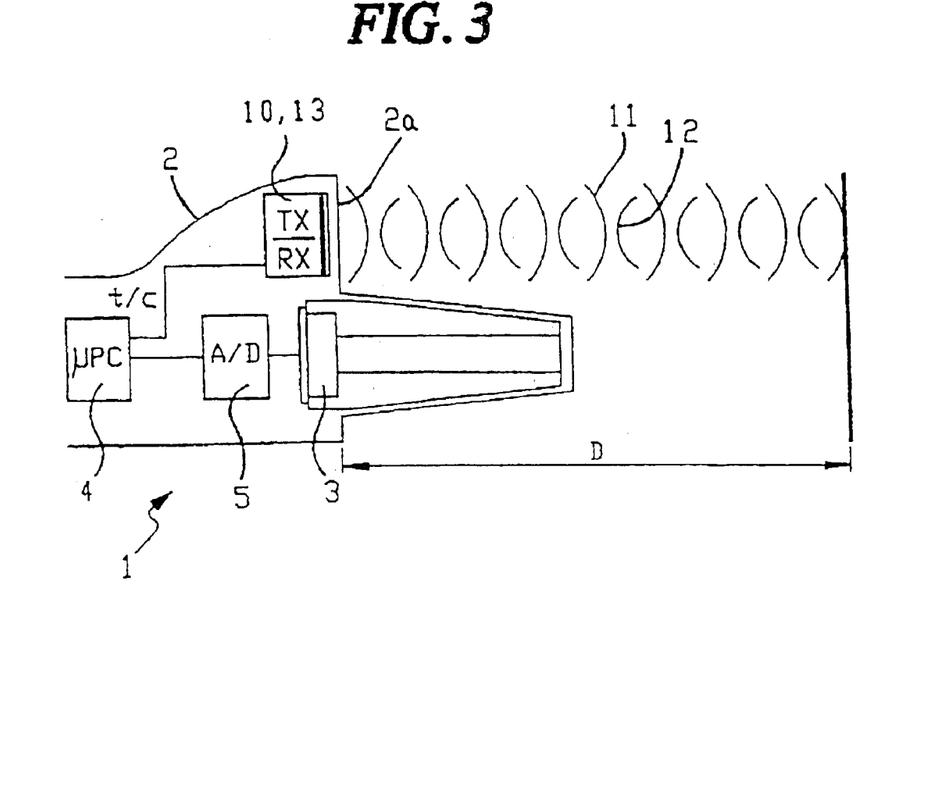
FIG. 3 shows a variation with respect to FIGS. 2a and 2b of the control means able to be terminally associated to an infrared thermometer according to the invention.
Figure 4:
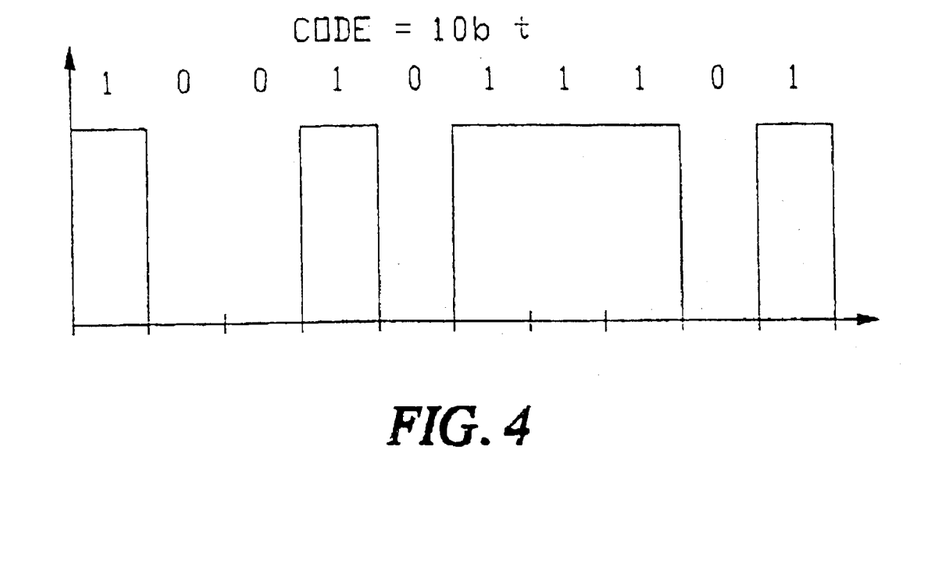
FIG. 4 shows a possible coding of the signal emitted by the transmitter comprised in the control means as per FIGS. 2a, 2b and 3.

From a more strictly constructive point of view, it should be noted that the control means may comprise a transmitter 10 and a receiver 13 dissociated from each other (see FIGS. 2a and 2b) in which case transmitter and receiver can operate simultaneously. Alternatively, a single frequency transducer device 10, 13 may be provided, able to serve both as a transmitter and as a receiver (FIG. 3). In this case the transmitter and the receiver shall operate at separate and successive intervals.

With reference to the nature of the undulatory signal emitted by the transmitter, it should be noted that although in theory such a signal may be electromagnetic in nature, an acoustic undulatory signal is preferable. This allows to operate with extremely simple and inexpensive circuitry, and easily to detect the time delays between transmission and reception without the use of excessively sophisticated time measuring systems, given the modest distances involved.

It should be noted that normally the transmitted signal is coded (FIG. 3 shows an example of 10 bit coding) so that the signal cannot in any way be influenced by external magnetic or sound fields which may be superimposed on the one generated by the transmitter during the measurement.

From a frequency standpoint, in order to have sufficient resolution and hence the ability to perceive positioning variations of even a few millimeters, the undulatory signal emitted by the transmitter must present a sufficiently high frequency and in particular in excess of 20 kHz, preferably equal to roughly 40 kHz.

Figure 5:
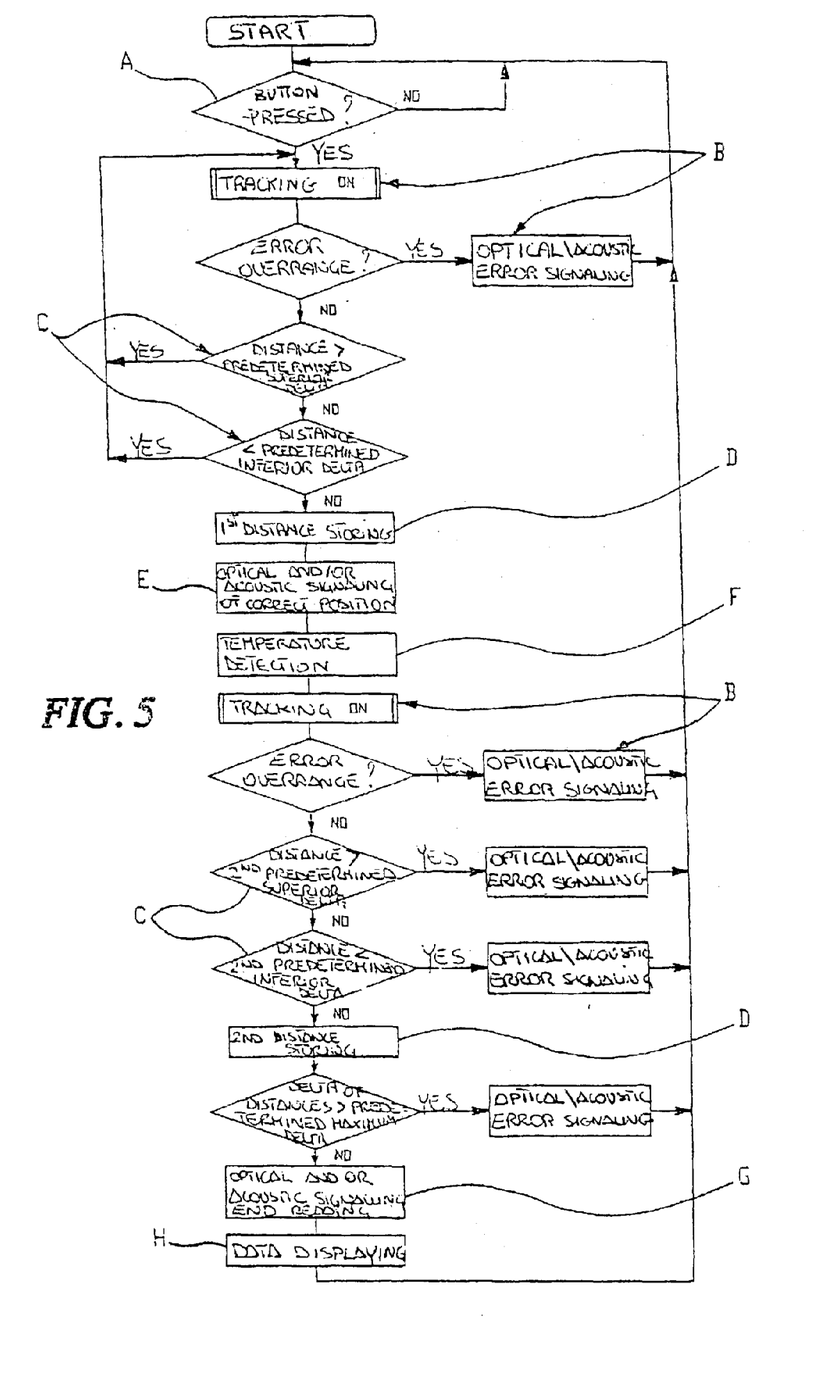
FIG. 5 is a block diagram schematically showing the operation of the control means as per FIGS. 2a, 2b and 3.
Figure 6:
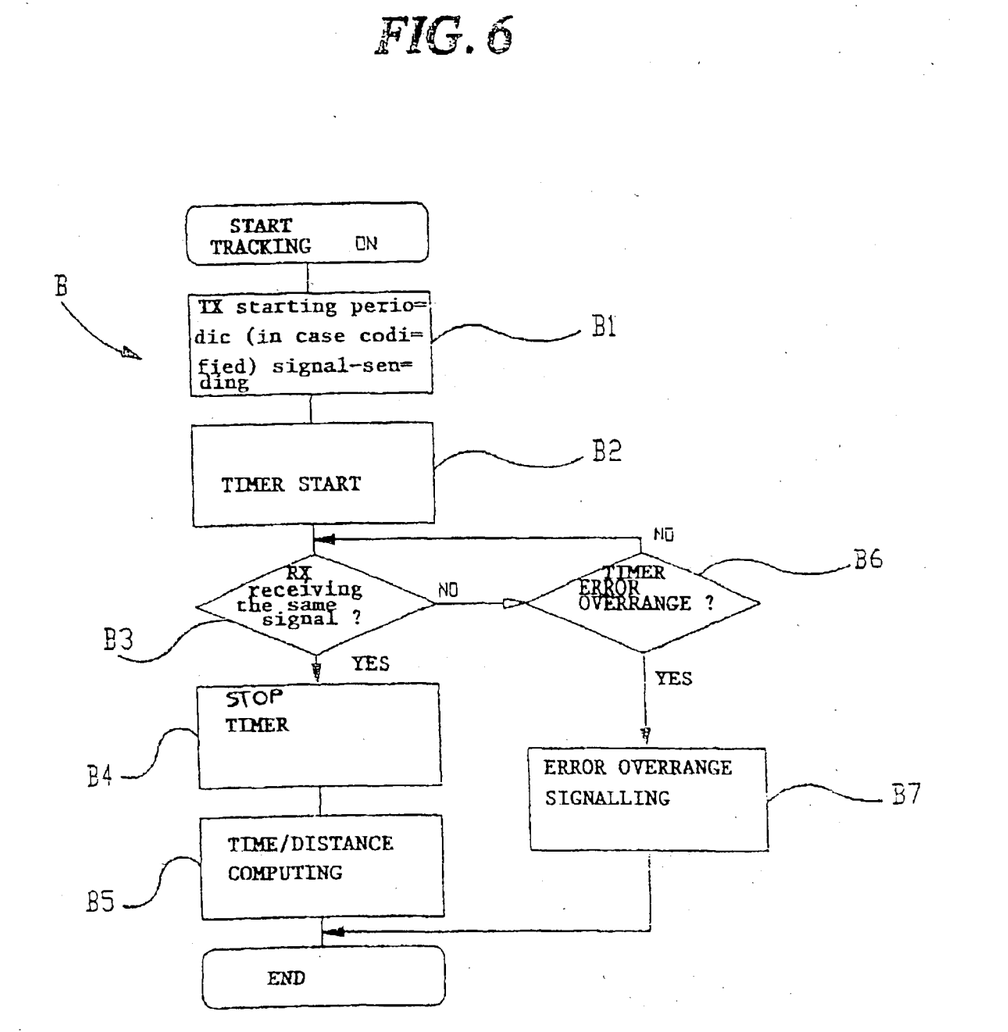
FIG. 6 shows in greater detail, also by means of a block diagram, some typical operative phases in the operation of the control means in FIGS. 2a and 2b.
Figure 7:
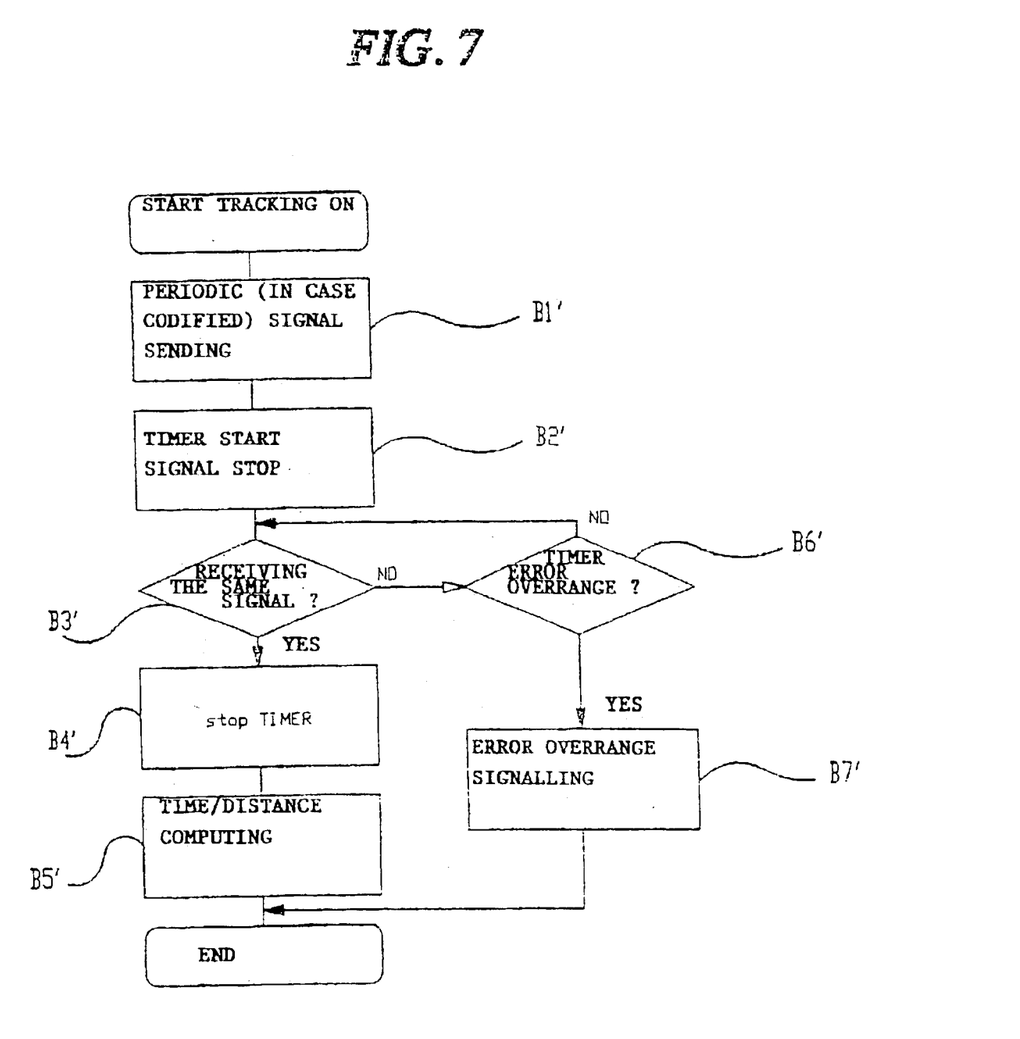
FIG. 7 shows schematically and in detail, also with a block diagram, some typical operative phases of the control means as per FIG. 3.

After the mainly structural description provided above, a more detailed analysis will now be provided of the operation of the control means and hence of the infrared thermometer as per FIGS. 2a through 4. The operation of such control means is schematically shown in FIGS. 5, 6 and 7 whereto reference will be made hereafter. When the infrared thermometer is in the operating condition, the processing unit verifies in a first phase (indicated as A in FIG. 5) whether the user has given a command to activate the thermometer. If so, then the control means are activated (phase B) to measure the actual distance of the transducer from the area to be measured. If the transmitter and the receiver are separate (FIG. 6), the transmitter sends a coded undulatory signal (phase B1) whilst the control unit causes the start of a counter or timer (phase B2).

When the reception unit receives the coded signal (phase B3) coming from the transmitter, the timer is stopped (phase B4) computing the distance (phase B5); if the timer is not stopped within a time interval exceeding a pre-set maximum value (phase B6), an over range signal is given (phase B7).

If instead the distance measurement is completed, such distance is compared with the pre-set value (phase c) and stored (phase D) if it falls within the pre-set interval of acceptable values near the pre-set distance "D". In addition to storing the distance, the processing unit proceeds to signal acoustically or optically (phase E) that the condition of correct positioning of the user has been reached and hence to measure the temperature (phase F). Once the above actions have been completed, the cycle is repeated essentially unchanged storing a second distance in the ways described above. Note that in the measurements following the first one, i.e. when the correct positioning of the thermometer has been reached at least once, it is possible to provide for a range of acceptability around the pre-set distance "D" that exceeds the range of acceptability of the first measurement. This allows to avoid error indications caused by a minimal movement in the position of the thermometer, movement which is detected by the system, but which would actually be irrelevant for temperature evaluation purposes; once the substantially suitable distance is reached, minimal vibrations may be acceptable since the mean of a plurality of measured temperature values shall in any case be reliable. The fact that the first range is narrower than the second (second measurement) assures that, if the reading is activated when the transducer is at the maximum limit of acceptability of the first range, a further minimal move away of the transducer still allows to remain within the second range.

Once the processing unit has accumulated a predetermined number of thermometric measurements, it commands the signalling means in the emission of an optical and/or acoustic end-of-reading signal (phase G) sending the thermometric data to a display system for visualisation (phase H). If alternatively to the description above control means are used of the type as per FIG. 3, the distance computation phase is slightly modified (see FIG. 7). In this case, the processing unit commands the transmitter determining the transmission of an undulatory signal which may be coded (phase B1'); after at least one period the emitted signal is stopped while at the same time a counter or timer is started (phase B2') and switching the transmitter to the receive mode; when the receiver detects the return signal (phase B3') from the area to be measured due to the previous transmitted signal, the timer is stopped (phase B4') performing the same operative phases described above, i.e. distance computation (phase B5') or over range indication (phase B7') if an excessively long time has elapsed (phase B6'). Once the distance is computed, this value is correlated with the range of acceptability and, depending on whether the measured distance value is found to lie within said range, the temperature measurement and storage procedure may or may not be initiated.

Figure 8:
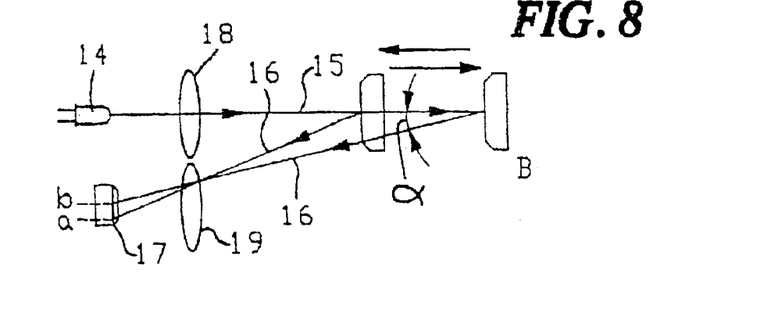
FIG. 8 schematically shows a third embodiment of the control means tasked with defining the correct positioning of the subject thermometer.
Figure 9:
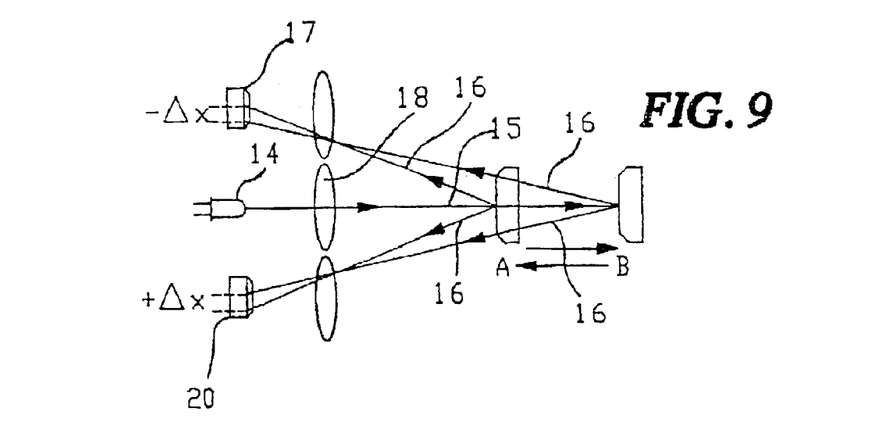
FIG. 9 is a fourth embodiment of the control means associated with the subject infrared thermometer.
Figure 10:
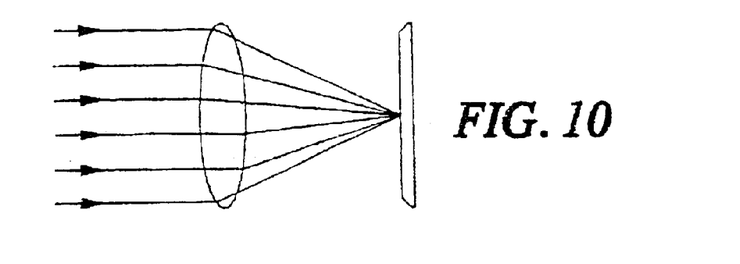
FIG. 10 schematically shows a focusing lens solution usable with the devices as per FIGS. 8 and 9.
Figure 11:
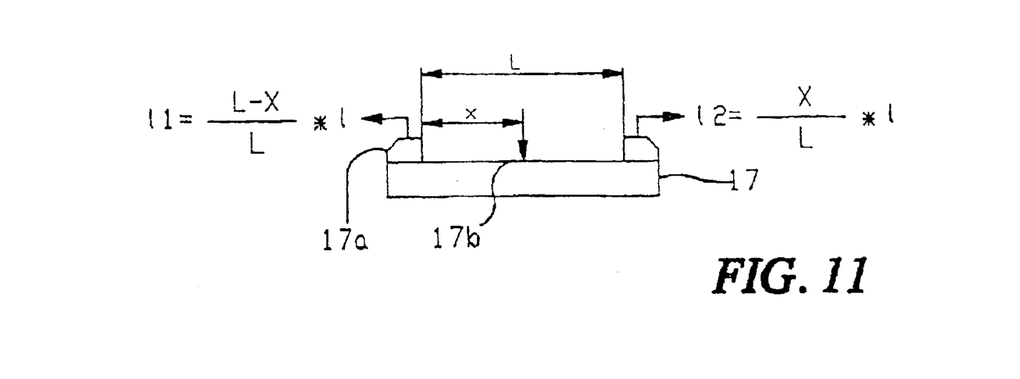
FIG. 11 is a diagram showing a measuring organ set to be employed in the control means as per FIGS. 8 and 9.
Figure 12A:
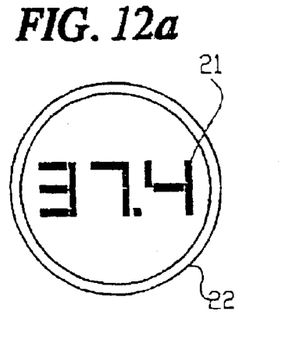
FIGS. 12 through 18 show examples of primary and secondary figures transmitted on the patient to effect the positioning of the subject thermometer in accordance with a fifth embodiment of the control means.
Figures 12B, 12C:
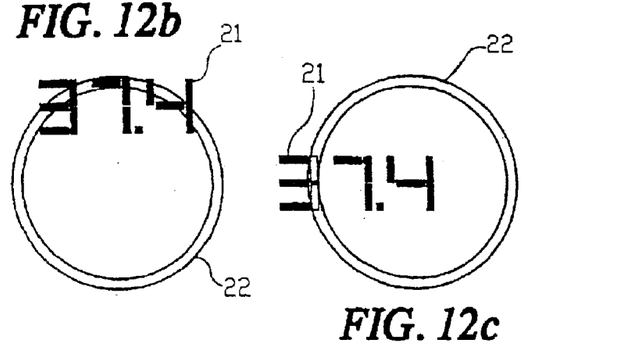

A third embodiment of the control means is shown in FIGS. 8 and 9; in these figures, the control means comprise an emitter 14 of a light beam 15 set to be incident upon the patient's measured area determining a corresponding return signal 16 which is incident on a first measuring organ distanced from the emitter and set to determine the inclination angle defined between the incident beam and the return signal from the measured area. More specifically the emitter, normally constituted by a diode or by a laser source, emits a light beam incident upon a lens 18 set to confer to the light beam an essentially cylindrical shape. The light beam exiting the lens strikes the area to be measured thereby generating a return signal which is linked to the position and in particular to the distance of the area to be measured with respect to the emitter (see FIG. 8). The return signal suitably focused by a lens 19 associated with the first measuring organ is focused thereon in a position linked to the inclination angle defined between light beam and return signal. In practice the first measuring organ 17 is a circuit component able to output a current proportional to the distance X defined between one end 17a of the first organ and the focus point 17b of the return signal (see the diagram in FIG. 11: output current I1=predefined current I*(L-x)/l where l=length of measuring device 17).

The measuring signal exiting the first measuring organ is therefore proportional to the inclination angle between the incident signal and the return signal. The measuring signal is then managed by a processing unit to determine the actual distance of the area to be measured and hence to define when said correct positioning condition has been reached. The alternative shown in FIG. 9 provides for a first measuring organ 17 and a second measuring organ 20 both distanced on opposite sides with respect to the emitter 14; the structure of such measuring organs is absolutely similar to the description provided above with reference to FIG. 8.

The first and the second measuring organs generate at their outputs a respective measuring signal each of which reaches a processing unit which in turn determines the actual distance of the intensity transducer both on the basis of the output measuring signal from the first measuring organ and on the basis of the output measuring signal from the second measuring organ.

It should be noted that the light beam from the emitter can be either visible or invisible and, in any case, it is preferably modulated and/or coded in order to prevent any interference.

Figure 19:
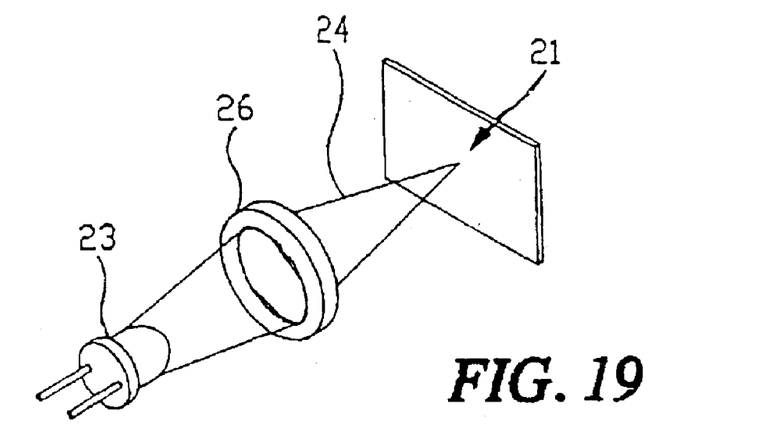
FIGS. 19 through 21 pertain to some variations of the fifth embodiment of the control means.
Figure 20:
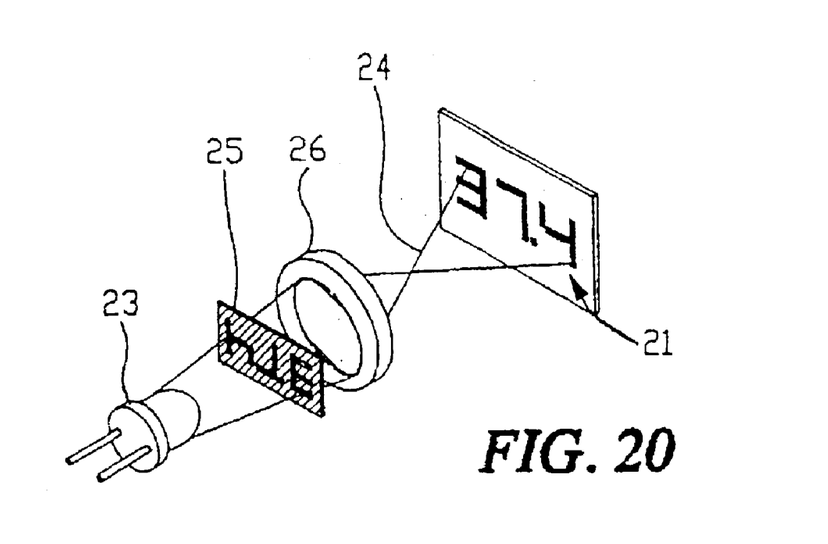
Figure 21:
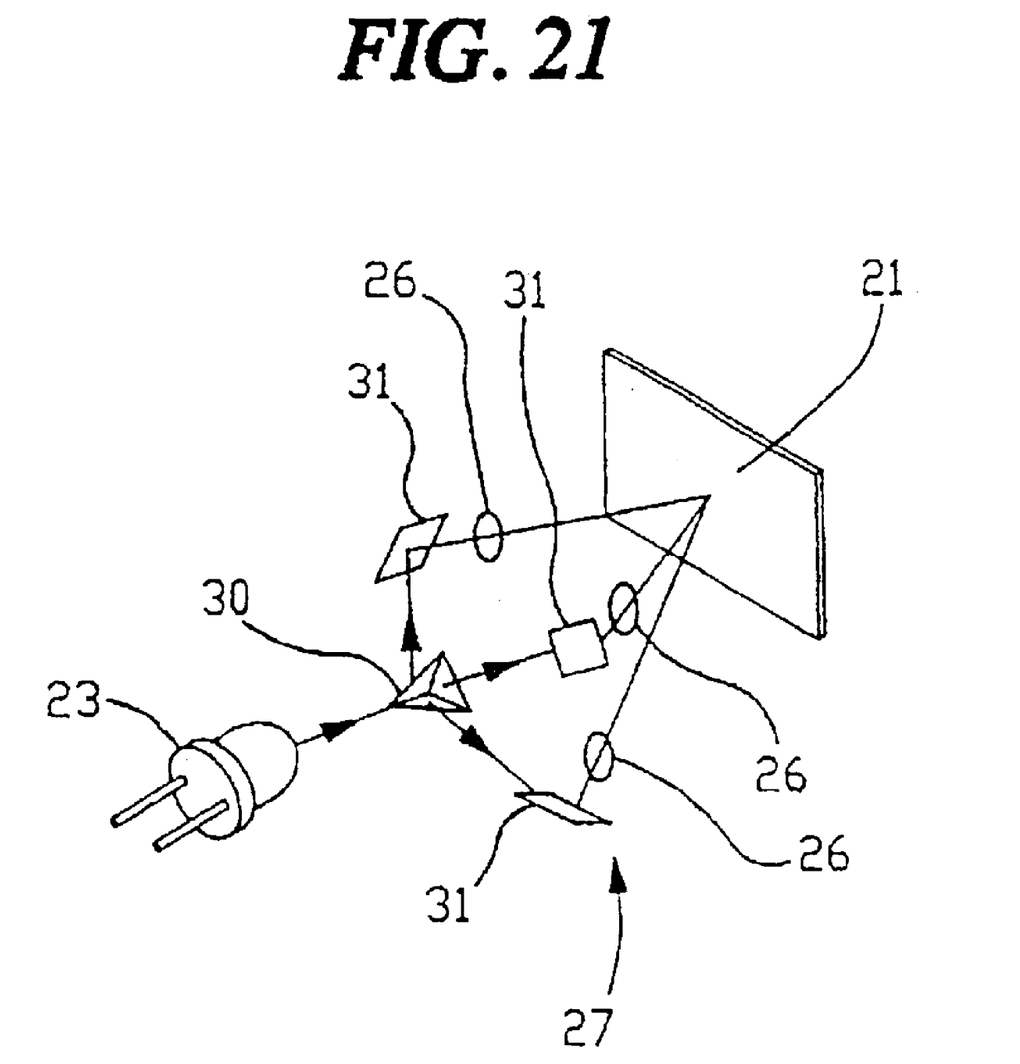

In a fifth embodiment shown in the drawings of FIGS. 19, 20, 21, the control means comprise means 23 for generating at least one primary light beam 24, such generating means are also set to focus a predetermined primary FIG. 21 (see FIGS. 12a through 18) substantially in correspondence with the area to be measured when the intensity transducer is in conditions of correct positioning at the pre-set distance "D" from the area to be measured.

In other words, the light beam will focus only when the transducer reaches the pre-set distance "D", vice versa the primary figure will be unfocused if the thermometer and hence the transducer rigidly associated thereto is not in the condition of correct positioning.

It should be noted that preferably the control means comprise also an optical selector element 25, for instance of the LED matrix type, or constituted by a simple template suitably shaped associated downstream to generating means and operating on the primary light beam to determine the shape of the figure that is focused on the area to be measured.

Advantageously, it may be provided for the processing unit to be active on the optical selector element to vary the shape of the figure preferably as a function of the temperature of the area to be measured.

In practice, the figure that focuses on the area to be measured upon reaching the correct positioning of the thermometer will differ depending on the temperature measured by the transducer.

For example, the shape of the figure may itself define the digital representation of the temperature reigning within the area to be measured.

In this way when the thermometer reaches the correct positioning, a figure that immediately provides the temperature indication will be focused.

Constructively the optical selector element can advantageously comprise a liquid crystal matrix wherein each crystal can be selectively movable, upon the action of the processing unit, between a condition of transparence wherein it allows the light beam from the generating means to pass through, and an opaqueness condition, wherein it does not allow said light beam to pass through.

It will thereby be possible to obtain with extreme ease the representation of a figure with any shape whatsoever without particular structural complications or increases to the costs related to the infrared thermometer as a whole.

Downstream of the optical selector element or elements may be provided sets of focusing lenses 2b, for instance comprising one or more bi-convex or plano-convex or concave lenses possibly coupled mutually in series and active on each light beam exiting from the selector element or elements. Such sets of lenses shall advantageously be designed in such a way as to assure a pre-set focusing distance of the primary figure so that small motions of the thermometer determine almost immediately the departure from the focused condition and hence the corresponding perception of an incorrect positioning by the user.

Downstream of the generating means 23 an optical sectioning set 27 may also operate which shall be able to separate the beam exiting the means 23 into two or more rays and to send back such rays on the area to be measured (see FIG. 21). The sectioning set comprises in the example of FIG. 21 a pyramid with triangular base 30 for sectioning the beam coming from the means 23 into three rays which are then suitably directed towards a common focus by respective inclined mirrors 31.

In accordance with one variation of the thermometer, it may be provided for the generating means to determine also a secondary light beam converging with said primary light beam to define at least one secondary FIG. 22 which, in correspondence with the correct positioning of the intensity transducer, is composed with the primary figure; in practice in this case the control means will cause both the primary figure to be focused and a predetermined relative positioning between primary and secondary figure to be reached (in a manner substantially similar to the description provided with reference to the embodiment of FIG. 1) in order visually to signal to the user that the correct positioning condition has been reached.

FIGS. 12*a* through 18 show some possible shapes which the primary and the secondary figure may assume; in particular the secondary figure may present a shape defined for instance by a closed circular, elliptical, rectangular line (FIGS. 12*a*, 12*b*, 12*c*, 16) able substantially to delimit the area to be measured on the patient and substantially to circumscribe the main FIG. 21 defined by the focusing of the primary beam upon reaching the correct positioning condition.

Figure 13:
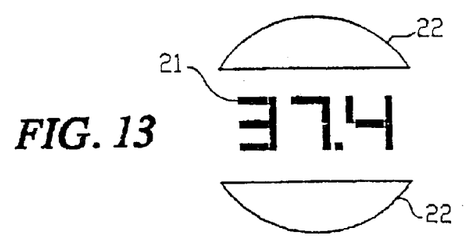
Figure 14:
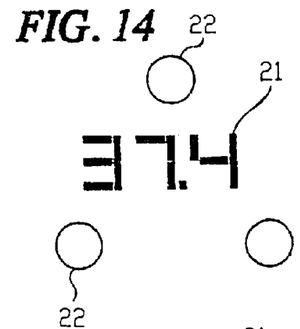
Figure 15:
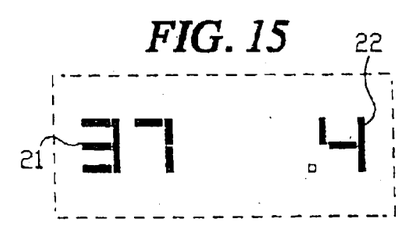
Figure 16:
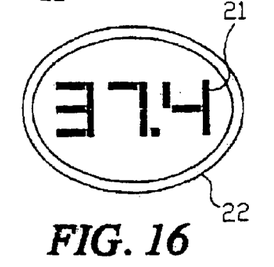
Figure 17:
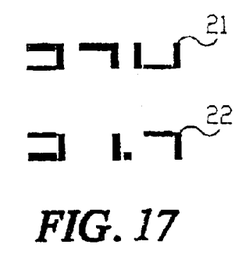
Figure 18:
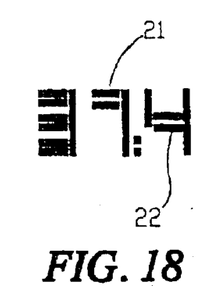

Obviously, the secondary FIG. 22 may assume other shapes with respect to the description above, provided that such shapes are able to give an immediate perception that said correct positioning condition has been reached (FIGS. 13, 14).

By way of example, FIG. 14 shows a secondary figure comprising three spot beams arranged in a triangle, whereas FIG. 13 shows a further alternative wherein the secondary figure is defined by two circumference portions opposing each other and delimiting within them an area wherein the primary figure (in this case constituted by the digital representation of the temperature) is positioned upon reaching the correct positioning condition.

Alternatively to the description provided above, the control means may comprise an optical selector element, preferably LED matrix i.e. similar to the optical selector element described above, operating on the secondary light beam to determine the shape of said secondary figure.

Also in this case the processing unit may be active on the optical selector element to vary the shape of the secondary figure preferably as a function of the temperature of the area to be measured.

In the correct positioning condition of the intensity transducer at the pre-set distance D from the area to be measured, the secondary figure (for instance total or partial representation of the temperature) will be substantially superimposed (FIG. 18) on the primary figure, or associated to the primary figure (FIGS. 15, 17) thereby defining therewith a complete representation of the temperature.

Going further into constructive details, it should be specified that the generating means may comprise at least two light sources, one for generating the primary light beam and one for generating the secondary light beam, or a single light sourcef which sends a beam on optical separation means downstream of which the primary light beam and the second light beam exit.

Note also that the processing unit may be active on the generating means to vary the hue at least of the primary light beam and/or of the secondary light beam according to the temperature of the area to be measured so that the user's perception can be accentuated when particularly elevated temperatures need to be indicated.

The generating means best suited to the use described above are generally constituted by mono, bi or multi-chromatic LED sources and/or laser sources. Obviously, although laser or LED sources are preferable for portable thermometers, the use of generating means constituted by traditional lamps, for instance halogen, incandescent, etcetera, need not be excluded.

The invention attains important advantages.

In the first place, all the embodiments described above allow to effect a sufficiently correct positioning of the intensity transducer with systems which are practical to use, simple to construct and easy to implement in current infrared thermometers, whilst overcoming all the typical drawbacks of the prior art.

With reference to the particular embodiments, it should be noted that the first embodiment as per FIG. 1 reaches the highest possible degree of reliability since three or more converging rays, not mutually coplanar, prevent any possible error due to inclinations in the thermometer.

The second embodiment is very effective because it allows an automatic operation of the device with multiple temperature measurements in a few fractions of a second and hence with the indication of a temperature that actually equals the real temperature of the patient in correspondence with the measured area.

Note in particular that the system that uses sound waves is easily implemented in the thermometer and has reduced construction costs.

In terms of reliability and ease of operation, similar arguments also hold true for the system as per FIGS. 8 and 9.

Lastly the fifth embodiment using the technique whereby at least one primary light beam is focused is also extremely reliable and of practical, intuitive use even for not highly trained personnel.

Note that all the embodiments described above allow to have a correct positioning without the thermometer excessively approaching the patient and above all without any intrusion or contact with him/her.

What is claimed is:

1. Infrared thermometer (1) comprising:
   at least one intensity transducer (3), set to detect an infrared radiation emitted by an area to be measured of a patient and to generate at its output a corresponding measuring signal;
   a processing unit (4) operatively associated with said transducer (3) to receive the measuring signal and compute a corresponding temperature of the area to be measured;
   control means to define a correct positioning condition of said transducer (3) at a pre-set distance (D) from said area to be measured;
   wherein said control means comprises:
   at least one emitter (10) of an undulatory signal (11) meant to be incident upon the area to be measured to create a corresponding return undulatory signal (12);
   at least one receiver (13) set to detect the return signal (12);
   the processing unit (4) being set to compute a time delay between the return signal (12) and the incident signal (11) to determine an actual distance between the intensity transducer (3) and the area to be measured; and signaling means commanded by said processing unit (4) to signal to a user the substantial coincidence of the actual distance with said pre-set distance (D) and hence the reaching of the condition of correct positioning of said intensity transducer (3).

2. Infrared thermometer (1) according to claim 1, wherein said processing unit (4) automatically computes the temperature of the measured area when said correct positioning condition of the transducer (3) is reached.

3. Infrared thermometer (1) according to claim 1, wherein said processing unit (4) computes the temperature a plurality of consecutive times obtaining a plurality of temperature values and assigning as the actual value of the temperature of the measured area the mean of the computed temperature values.

4. Infrared thermometer (1) according to claim 1, wherein the processing unit (4) assigns a pre-set differential defining an interval (D-Δ, D Δ) the actual distance being deemed to correspond with said pre-set distance (D) when the actual falls within the interval.

5. Infrared thermometer (1) according to claim 1, wherein said emitter (10) operates simultaneously with said receiver (13) which is separated from the emitter (10) itself.

6. Infrared thermometer (1) according to claim 1, wherein said emitter (10) and said receiver (13) operate alternatively at separate and successive time intervals, said emitter (10) and said receiver (13) being defined by a single frequency transducer.

7. Infrared thermometer (1) according to claim 1, wherein said emitter (10) irradiates an acoustic or electromagnetic undulatory signal (11).

8. Infrared thermometer (1) according to claim 1, wherein said emitter (10) irradiates a coded undulatory signal (11).

9. Infrared thermometer (1) according to claim 1, wherein said emitter (10) irradiates an undulatory signal (11) whose frequency exceeds 20 kHz.

10. Infrared thermometer (1) comprising:
   at least one intensity transducer (3), set to detect an infrared radiation emitted by an area to be measured of a patient and to generate at its output a corresponding measuring signal;
   a processing unit (4) operatively associated with said transducer (3) to receive the measuring signal and compute a corresponding temperature of the area to be measured;
   control means to define a correct positioning condition of said transducer (3) at a pre-set distance (D) from said area to be measured;
wherein said control means comprises:
   at least one emitter (10) of an undulatory signal (11) meant to be incident upon the area to be measured to create a corresponding return undulatory signal (12);
   at least one receiver (13) set to detect the return signal (12);
   the processing unit (4) being set to compute a time delay between the return signal (12) and the incident signal (11) to determine an actual distance between the intensity transducer (3) and the area to be measured; and
   said processing unit (4) performs the computation of the temperature a plurality of consecutive times obtaining a plurality of values and assigning as the actual value of the temperature of the measured area the mean of the computed temperature values.

11. Infrared thermometer (1) comprising:
   at least one intensity transducer (3), set to detect an infrared radiation emitted by an area to be measured of a patient and to generate at its output a corresponding measuring signal;
   a processing unit (4) operatively associated with said transducer (3) to receive the measuring signal and compute a corresponding temperature of the area to be measured;
   control means to define a correct positioning condition of said transducer (3) at a pre-set distance (D) from said area to be measured;
wherein said control means comprises:
   at least one emitter (10) of an undulatory signal (11) meant to be incident upon the area to be measured to create a corresponding return undulatory signal (12);
   at least one receiver (13) set to detect the return signal (12);
   the processing unit (4) being set to compute a time delay between the return signal (12) and
   the incident signal (11) to determine an actual distance between the intensity transducer (3) and the area to be measured; and
   said processing unit (4) assigns a pre-set differential defining an interval (D-Δ, D Δ) the actual distance being deemed to correspond with said pre-set distance (D) when the actual falls within the interval.

* * * * *

UNITED STATES PATENT AND TRADEMARK OFFICE
CERTIFICATE OF CORRECTION

PATENT NO. : 6,742,927 B2
DATED : June 1, 2004
INVENTOR(S) : Francesco Bellifemine It is certified that error appears in the above-identified patent and that said Letters Patent is hereby corrected as shown below:

Title page,
Item [30], Foreign Application Priority Data, please delete "MI98A0169" and insert therefor -- MI98A000169 --.

Column 10,
Line 19, please delete "the" and insert therefor -- said --.

Column 11,
Line 3, please delete "(D-$\Delta$, D $\Delta$)" and insert -- (D-$\Delta$, D+$\Delta$) --.
Line 5, before "falls", please insert -- distance --.

Column 12,
Line 19, please delete "the" and insert therefor -- said -- (both occurrences).
Line 25, please delete "(D-$\Delta$, D $\Delta$)" and insert -- (D-$\Delta$, D+$\Delta$) --.
Line 27, after "actual", please insert -- distance --.

Signed and Sealed this

Nineteenth Day of April, 2005

JON W. DUDAS
*Director of the United States Patent and Trademark Office*